United States Patent Office 3,299,139
Patented Jan. 17, 1967

3,299,139
5 - (3' - DIMETHYLAMINOPROPYLIDENE)-DIBENZO [a,d] - CYCLOHEPTA - [1,4] - DIENE N-OXIDE AND HYDROCHLORIDE THEREOF
Jørgen Brix Pedersen, Copenhagen-Hvidovre, Denmark, assignor to A/S Dumex (Dumex Ltd.), Copenhagen, Denmark, a Danish company
No Drawing. Filed Feb. 14, 1964, Ser. No. 344,817
Claims priority, application Great Britain, Feb. 20, 1963, 6,857/63
1 Claim. (Cl. 260—570.8)

This invention relates to a novel psychotherapeutic drug, and to methods for the production thereof.

More particularly, the invention relates to the N-oxide of 5-(3'-dimethylaminopropylidene)-dibenzo(a,d)-cyclohepta-1,4-diene and its acid addition salts, and to the preparation thereof.

The compound has anti-depressive properties, although none of the usual screening methods are indicative thereof.

However, the effect has been clearly demonstrated in rats, showing that the N-oxide of the invention prevents the depression and increased parasympathetic activity, which can be experimentally produced by means of reserpine.

Thus the present compound is particularly useful for the treatment of endogenic depressions, having a sedative effect, but, contrary to those anti-depressants now in current use, no anticholinergic effect, which means that a number of inconvenient side effects are avoided by applicating the present drug.

According to the invention, the compound can be produced by:

(a) reacting 5-(3'-halopropylidene)-dibenzo(a,d)-cyclohepta-1,4-diene with dimethylhydroxyl amine in the presence of an acid-binding agent, or (b) reacting 5-(3'-dimethylaminopropylidene)-dibenzo (a,d)-cyclohepta-1,4-diene with hydrogen peroxide, and isolating the resulting N-oxide as such or as an acid-addition salt from the reaction mixture.

The reaction is expediently carried out in an inert organic solvent, in the reaction with dimethylhydroxylamine preferably acetone, and in the reaction with hydrogen peroxide preferably methanol or other low-molecular aliphatic alcohol.

A suitable acid-binding agent is potassium carbonate.

To form an acid-addition salt of the present compound, any physiologically acceptable acid can be used, such as hydrochloric acid.

The sedative effect of the present compound has been demonstrated in the following experiments.

The depression in motor activity after intraperitoneal administration of the compound of the invention in a dose of 20 mg. per kg. bodyweight was determined in cross-over tests in 6 male rats as compared with 6 other male rats to which was intraperitoneally administered the equal volume of physiological saline. The average weight of the rats was 236 g. In arbitrary units, the total motor activity of the controls 16 hours after the administration was 228 units, whereas the total motor activity of the 6 rats, to which the compound of the invention was administered, was only 183 units after a similar period of time, i.e. a decrease of 45 units.

For comparative purposes, a corresponding test was made with the known N-(3-dimethylaminopropyl)-iminodibenzyl hydrochloride, showing a decrease of the total motor activity of 96 units.

Thus, the sedative effect of the compound of the invention is somewhat lesser than that of the known anti-depressant. In return, the anticholinergic effect of the compound of the invention is substantially reduced as compared with that of the known anti-depressant, which appears from the following table on the spasmolytic effect on isolated intestine from guinea pigs. The table further shows the effect of the hydrochloride of the compound of the invention less the N-oxide group the effect for all three substances having been given in proportion to that of the wellknown spasmolytic agent, 2-dimethyl-aminoethyl-benzhydryl ether, the spasmolytic effect of which is used as a unit.

|  | Spasms produced by— | | | |
|---|---|---|---|---|
|  | Acetyl choline | Hist-amine | Sero-tonine | Barium chloride |
| N-(3-dimethylaminopropyl)-iminodibenzyl, HCl | 1.8 | 0.9 | 2.9 | 2.5 |
| 5-(3'-dimethylaminopropylidene)-dibenzo(a,d)-cyclohepta-1,4-diene, HCl | 12 | 4.7 | 14 | 8.2 |
| 5-(3'-dimethylaminopropylidene)-dibenzo(a,d)-cyclohepta-1,4-diene N-oxide | 0.22 | 0.05 | 0.10 | 0.13 |

The table shows that the compound of the invention has an exceedingly low spasmolytic effect in comparison to that of the known substances. Particularly, it should be noted that the spasmolytic effect in spasms produced by acetyl choline is very feeble, since acetyl choline is the chemical transmitter in the parasympathetic nerve system which, accordingly, would not be influenced by administration of the present drug.

As regards toxicity, the three compounds of the table are about equal, the toxicity in the order of the table being 110 mg./kg., 88 mg./kg. and 80 mg./kg., respectively, as determined by intraperitoneal administration in mice.

The following examples illustrate, but in no way limit, the manner in which production of the compound of the invention can be carried out in practice.

*Example 1*

31.3 g. (0.1 mole) of 5-(3'-dimethylaminopropylidene)-dibenzo(a,d) - cyclohepta - 1,4 - diene hydrochloride is dissolved in water, and the free base is liberated by means of a 28% aqueous solution of sodium hydroxide. The free base is sucked off, washed with water, and dissolved in 100 ml. of methanol. To the solution is added 31 ml. of 30% hydrogen peroxide. After 7 days, the reaction mixture is diluted with 200 ml. of water, and the major part of the methanol is evaporated in vacuum. The precipitated N-oxide crystals are filtered off, washed with water, and dried, yielding 27 g. of the dihydrate of 5-(3'-dimethylaminopropylidene)-dibenzo(a,d)-cyclohepta-1,4-diene N-oxide with M.P. 102–103° C. In dehydrated state the M.P. is 228–230° C.

By dissolving the N-oxide in acetone, and bubbling dry hydrogen chloride gas through the solution until slightly acid reaction, the hydrochloride of the N-oxide is precipitated as a white crystalline substance with M.P. 172–173.6° C.

Example 2

31.3 g. (0.1 mole) of 5-(3'-bromopropylidene)-dibenzo-(a,d)-cyclohepta-1,4-diene, 7.3 g. of dimethylhydroxylamine, and 14 g. of potassium carbonate in 200 ml. of acetone are refluxed for 6 hours. The precipitated N-oxide is filtered off, washed with acetone and then with water, and is finally re-crystallized from a mixture of methanol and acetone (1:3), yielding 22 g. of white crystals with M.P. 228–230° C.

The free base can be transformed into an acid addition salt in usual manner, for example into the hydrochloride by precipitating a methanol-acetone solution with gaseous hydrogen chloride.

The starting material of Example 1 can be prepared in known manner from dibenzo(a,d)-cyclohepta-1,4-dien-5-one by a Grignard reaction with 3-dimethylaminopropyl magnesium chloride, hydrolysis and dehydration of the resulting carbinol. Halogenation of the resulting product yields the starting material of Example 2.

I claim:

A compound selected from the group consisting of 5-(3' - dimethylaminopropylidene) - dibenzo(a,d) - cyclohepta-1,4-diene N-oxide, and or the hydrochloric acid addition salt thereof.

References Cited by the Examiner

UNITED STATES PATENTS

| 2,862,968 | 12/1958 | Tiffany | 260—570 |
| 3,151,124 | 9/1964 | Huebner | 260—570.5 XR |

FOREIGN PATENTS

| 618,034 | 2/1949 | Great Britain. |

OTHER REFERENCES

Culvenor: "Reviews of Pure and Applied Chemistry," vol. 13, pp. 83–112, (pages 86 and 88), (1963).

Winthrop et al.: "Journal Organic Chemistry," vol. 27, pp. 230–40, (1962), pages 232 and 236.

CHARLES B. PARKER, *Primary Examiner.*

R. V. HINES, *Assistant Examiner.*